United States Patent
Duttagupta et al.

(10) Patent No.: US 10,241,902 B2
(45) Date of Patent: Mar. 26, 2019

(54) SYSTEMS AND METHODS FOR BENCHMARK BASED CROSS PLATFORM SERVICE DEMAND PREDICTION

(71) Applicant: Tata Consultancy Services Limited, Mumbai (IN)

(72) Inventors: Subhasri Duttagupta, Mumbai (IN); Mukund Kumar, Mumbai (IN); Dhaval Shah, Mumbai (IN); Manoj Karunakaran Nambiar, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/227,542

(22) Filed: Aug. 3, 2016

(65) Prior Publication Data
US 2017/0262362 A1 Sep. 14, 2017

(30) Foreign Application Priority Data
Mar. 9, 2016 (IN) .............................. 201621008262

(51) Int. Cl.
*G06F 9/44* (2018.01)
*G06F 11/36* (2006.01)
(Continued)

(52) U.S. Cl.
CPC ........ *G06F 11/3688* (2013.01); *G06F 11/302* (2013.01); *G06F 11/3428* (2013.01); *G06F 11/3447* (2013.01); *G06F 11/3495* (2013.01)

(58) Field of Classification Search
USPC ........................................................ 717/130
See application file for complete search history.

(56) References Cited

U.S. PATENT DOCUMENTS

| | | | | |
|---|---|---|---|---|
| 6,973,641 | B1 * | 12/2005 | Halstead | G06F 9/4425 345/440 |
| 7,296,256 | B2 * | 11/2007 | Liu | G06Q 10/04 717/104 |

(Continued)

FOREIGN PATENT DOCUMENTS

CN 101364229 2/2009

OTHER PUBLICATIONS

Gmach, D. et al., "Workload Analysis and Demand Prediction of Enterprise Data Center Applications", IISWC '07 Proceedings of the 2007 IEEE 10th International Symposium on Workload Characterization, IEEE Computer Society Washington, DC, pp. 171-180, 2007.

*Primary Examiner* — Anna C Deng
(74) *Attorney, Agent, or Firm* — Finnegan, Henderson, Farabow, Garrett & Dunner LLP (57) ABSTRACT

Systems and methods for benchmark based cross platform service demand prediction includes generation of performance mimicking benchmarks that require only application level profiling and provide a representative value of service demand of an application under consideration on a production platform, thereby eliminating need for actually deploying the application under consideration on a production platform. The PMBs require only a representative estimate of service demand of the application under test and can be reused to represent multiple applications. The PMBs are generated based on a skeletal benchmark corresponding to the technology stack used by the application under test and an input file generated based on application profiling that provides pre-defined lower level method calls, data flow sequences between multi-tiers of the application under test and send and receive network calls made by the application under consideration.

8 Claims, 8 Drawing Sheets

(51) Int. Cl.
*G06F 11/30* (2006.01)
*G06F 11/34* (2006.01)

(56) References Cited

U.S. PATENT DOCUMENTS

| | | |
|---|---|---|
| 9,052,954 B2 | 6/2015 | Gangemi et al. |
| 2005/0120341 A1* | 6/2005 | Blumenthal ........ G06F 11/3428 |
| | | 717/158 |

* cited by examiner

SYSTEMS AND METHODS FOR BENCHMARK BASED CROSS PLATFORM SERVICE DEMAND PREDICTION

PRIORITY CLAIM

This U.S. patent application claims priority under 35 U.S.C. § 119 to: India Application No. 201621008262 filed on 9 Mar. 2016. The entire contents of the aforementioned application are incorporated herein by reference.

TECHNICAL FIELD

The embodiments herein generally relate to performance modeling of applications and more particularly to benchmark based systems and methods for cross platform prediction of service demands of multi-tiered enterprise applications.

BACKGROUND

Performance characterization of a multi-tier enterprise application which is to be deployed on a particular production platform is a critical step prior to its release. However, due to various practical constraints, the production platform is often not available for application deployment or maybe available to a limited extent. Therefore, applications are deployed and performance-tested on a test platform which is often different from the production platform thereby creating a need for predicting application performance on the production (target) platform given its performance on a test (source) platform. Prediction of metrics such as request throughput and server utilization can be done using existing performance modeling tools provided service demands of the application (e.g. CPU execution time of a request) are known.

There are a large number of factors that can affect the CPU service time of an enterprise application such as workload characteristics, specific technology stack used by the application, amount of data exchanged with other servers and platform architecture characteristics. Building a parameterized model of execution time of an application program based on these factors is prohibitively complex.

SUMMARY

Embodiments of the present disclosure present technological improvements as solutions to one or more of the above-mentioned technical problems recognized by the inventors in conventional systems.

Predicting performance of multi-tier enterprise applications for a target platform is of significant importance especially when the target platform is unavailable for deployment or available to a limited extent only. Performance modeling techniques depend on accurate estimation of resource service demand for a specific application. Systems and methods of the present disclosure generate Performance Mimicking benchmarks (PMBs) that can predict resource service demand of application server of multi-tier on-line transaction processing (OLTP) applications on a target platform. PMBs do not require the actual application to be deployed on the target itself. These benchmarks invoke similar method calls as the application under consideration at different layers in the technology stack that contribute significantly to CPU utilization. Further, they mimic all send and receive interactions with external servers (e.g., database server) and web clients. The present disclosure also provides validation of the ability of PMBs for service demand prediction with a number of sample multi-tier applications including SPECjEnterprise2010™ on disparate hardware configurations. These service demands when used in a modified version of Mean Value Analysis algorithm, can predict throughput and response time with approximately 90% accuracy.

In an aspect, there is provided a method comprising profiling an application under test, by an application profiler, to obtain pre-defined method calls made by the application under test, wherein the pre-defined method calls correspond to a technology stack used by the application under test; capturing, by the application profiler, data flow sequences between client tier, application tier and database tier of the application under test; analyzing, by a network packet analyzer, one or more transactions of the application under test; generating, by an input file creator, an input file for each of the one or more transactions based on output from the application profiler and the network packet analyzer; selecting, from a skeletal performance mimicking benchmark (PMB) Repository, a skeletal benchmark corresponding to the technology stack used by the application under test; and generating, by a Performance Mimicking Benchmark (PMB) generator, a performance mimicking benchmark (PMB) corresponding to the application under test based on the skeletal benchmark and the input file.

In another aspect, there is provided a system comprising one or more processors; and one or more internal data storage devices operatively coupled to the one or more processors for storing: an input file creator configured to: receive, from an application profiler, pre-defined method calls made by an application under test, wherein the pre-defined method calls correspond to a technology stack used by the application under test; receive, from the application profiler, data flow sequences between client tier, application tier and database tier of the application under test; analyze one or more transactions of the application under test, received from a network packet analyzer; and generate an input file for each of the one or more transactions based on output from the application profiler and the network packet analyzer; a skeletal performance mimicking benchmark (PMB) Repository comprising skeletal benchmarks corresponding to one or more technology stacks usable by one more applications including the application under test; and a Performance Mimicking Benchmark (PMB) generator configured to: select, from the skeletal performance mimicking benchmark (PMB) Repository, a skeletal benchmark corresponding to the technology stack used by the application under test; and generate a performance mimicking benchmark (PMB) corresponding to the application under test based on the skeletal benchmark and the input file.

In yet another aspect, there is provided a computer program product comprising a non-transitory computer readable medium having program instructions embodied therein for profiling an application under test, by an application profiler, to obtain pre-defined method calls made by the application under test, wherein the pre-defined method calls correspond to a technology stack used by the application under test; capturing, by the application profiler, data flow sequences between client tier, application tier and database tier of the application under test; analyzing, by a network packet analyzer, one or more transactions of the application under test; generating, by an input file creator, an input file for each of the one or more transactions based on output from the application profiler and the network packet analyzer; selecting, from a skeletal performance mimicking benchmark (PMB) Repository, a skeletal benchmark corresponding to the technology stack used by the application under test; and generating, by a Performance Mimicking Benchmark (PMB) generator, a performance mimicking benchmark (PMB) corresponding to the application under test based on the skeletal benchmark and the input file.

In an embodiment of the present disclosure, the input file creator is configured to receive the pre-defined method calls, wherein the pre-defined method calls are lower level method calls selected based on invocation count and own execution time.

In an embodiment of the present disclosure, analyzing the one or more transactions comprises characterizing send and receive network calls between the application under test and one or more external services including a database and a client to estimate impact on CPU utilization.

In an embodiment of the present disclosure, selecting a skeletal benchmark is preceded by generating a repository of skeletal benchmarks corresponding to one or more technology stacks usable by one more applications including the application under test.

In an embodiment of the present disclosure, the method described herein above further comprises estimating service demand of the application under test on a target platform for a range of concurrencies based on service demand of the application under test and service demand of the performance mimicking benchmark on a source platform for the range of concurrencies and service demand of the performance mimicking benchmark on the target platform for the range of concurrencies.

In an embodiment of the present disclosure, wherein estimated service demand of the application under test on a target platform for the range of concurrencies is a ratio of (i) product of service demand of the application under test on the source platform and service demand of the performance mimicking benchmark on the target platform for the range of concurrencies and (ii) service demand of the performance mimicking benchmark on the source platform for the range of concurrencies.

It is to be understood that both the foregoing general description and the following detailed description are exemplary and explanatory only and are not restrictive of the disclosure, as claimed.

BRIEF DESCRIPTION OF THE DRAWINGS

The embodiments herein will be better understood from the following detailed description with reference to the drawings, in which.

It should be appreciated by those skilled in the art that any block diagram herein represent conceptual views of Illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Performance estimation of multi-tier online transaction processing (OLTP) applications forms an integral part of the software development life-cycle. Web based applications deployed by most enterprises make use of multi-tiered architectures. As performance of applications can be hampered by bottlenecks at the web, application or database tier servers, accurate pre-deployment capacity planning is necessary. Two commonly used methods for performance prediction are simulation and analytical modeling. These methods have been tried out earlier for enterprise applications but usage of these techniques for doing cross platform performance prediction is limited due to effort involved and complexity in identifying modeling parameters. Systems and methods of the present disclosure provide simple performance mimicking benchmarks (PMBs) for an application under test that can be executed on a target (production) platform. The information acquired from the benchmark execution along with application profiling information collected on a source (test) platform can be used to estimate application performance on the target platform. Unlike applications, the performance mimicking benchmarks of the present disclosure do not require installation and population of the application database or depend on multiple distributed services running on different servers. Hence, deployment of the performance mimicking benchmarks of the present disclosure are simpler. PMBs of the present disclosure are platform independent and take into account use of disk and network I/O and CPU instructions involved in enterprise application and can be used effectively to estimate service demands on any platform.

The expression "lower level method calls", in the context of the present disclosure refers to the terminologies as known in the art and are method calls made at underlying technology layers viz., database, application server or any external servers being used as opposed to application level or upper level method calls.

The expression "invocation count", in the context of the present disclosure refers to the total number of times a method is invoked by all its callers during the execution of a transaction or a higher level method call.

The expression "own execution time", in the context of the present disclosure refers to the amount of time a method takes excluding all the sub-calls it makes.

The expression "transaction", in the context of the present disclosure refers to a set of logical operations that start from a user request to receiving a response from the server.

In the context of the present disclosure, expressions "source platform" and "test platform" may be used interchangeably. Likewise, "target platform" and "production platform" may be used interchangeably.

Referring now to the drawings, and more particularly to FIGS. 1 through 7, where similar reference characters denote corresponding features consistently throughout the figures, there are shown preferred embodiments and these embodiments are described in the context of the following exemplary system and method.

Figure 1:
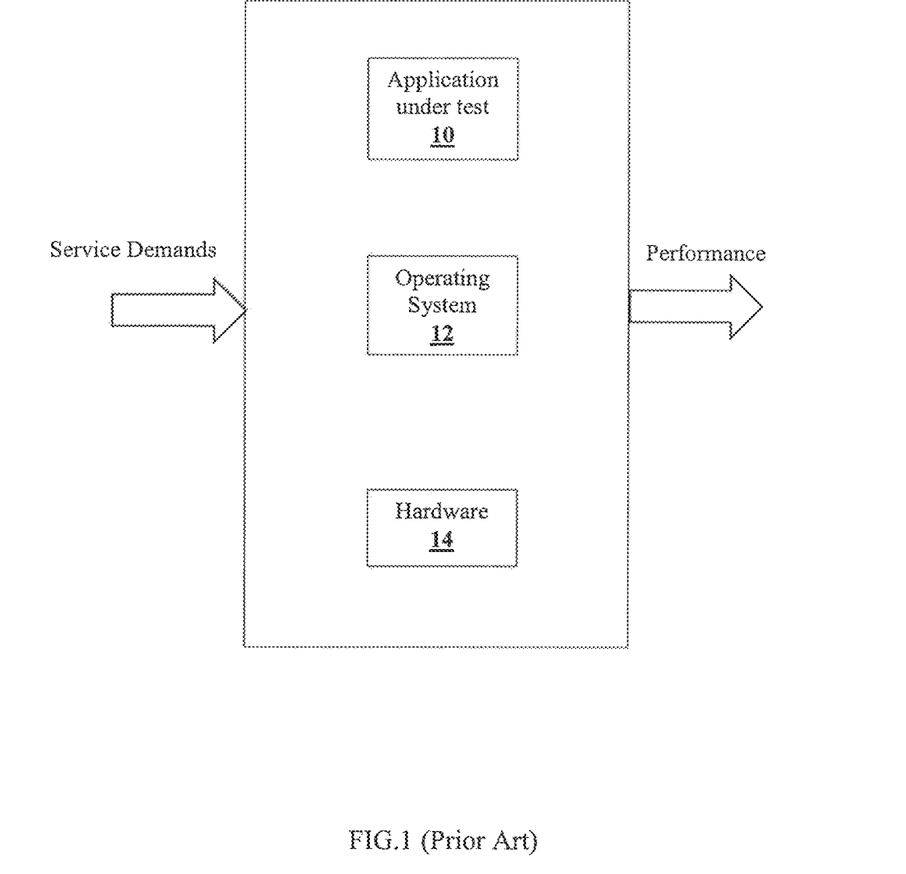
FIG. 1 illustrates a schematic representation of an application under test, as known in the art.
Figure 2:
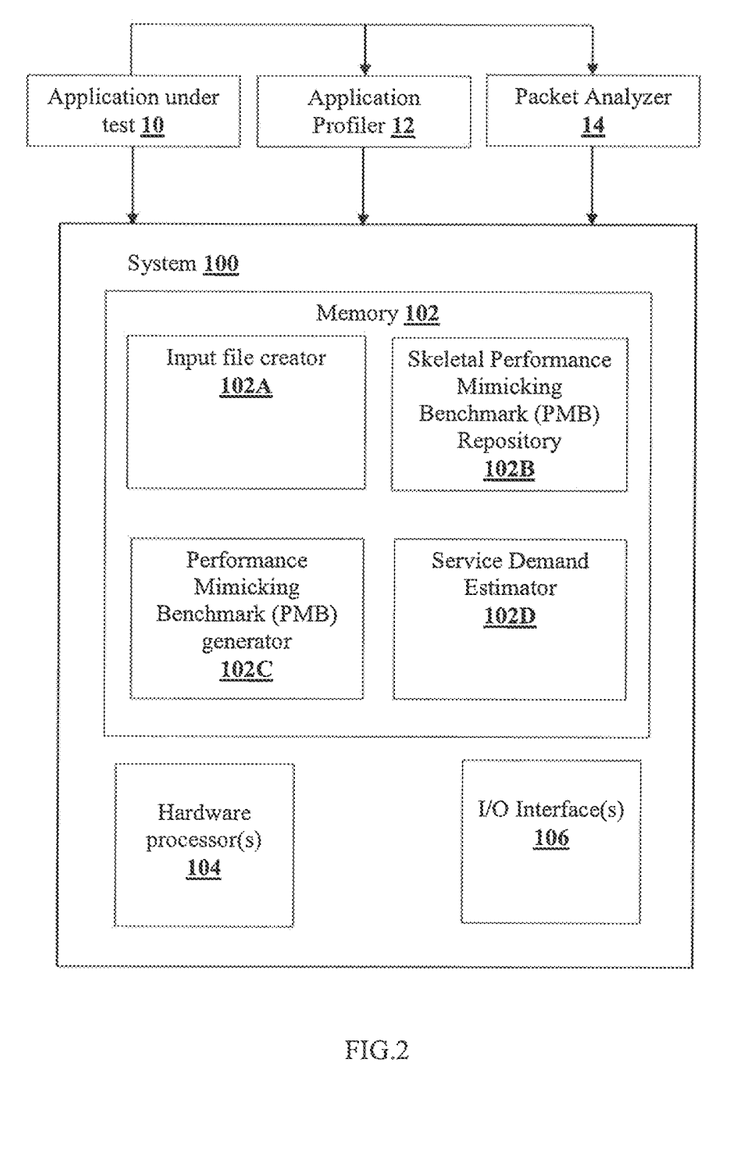
FIG. 2 illustrates an exemplary embodiment of a system for benchmark based cross platform service demand prediction in accordance with an embodiment of the present disclosure.
Figure 3:
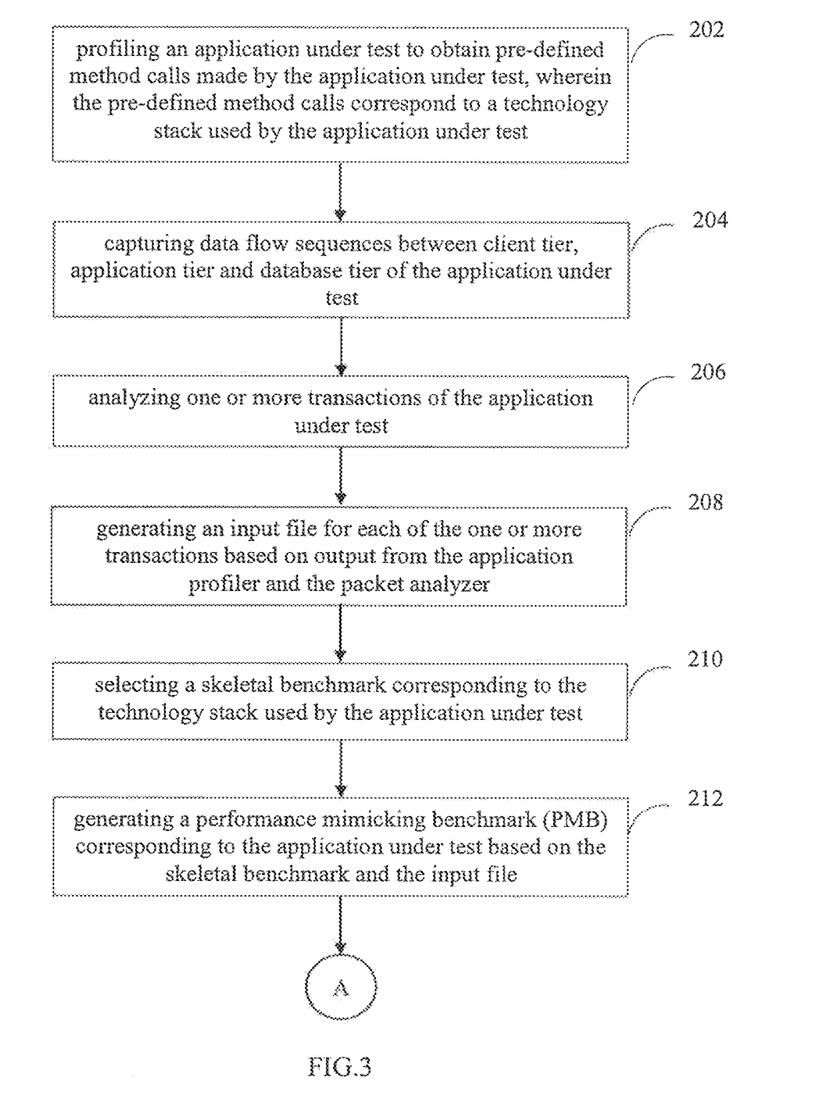
FIG. 3 is an exemplary flow diagram illustrating a method for benchmark based cross platform service demand prediction in accordance with an embodiment of the present disclosure.

FIG. 1 illustrates a schematic representation of an application under test 10, as known in the art hosted on an operating system 12 with associated hardware 14. FIG. 2 illustrates an exemplary embodiment of a system 100 for benchmark based cross platform service demand prediction of the application under test 10, in accordance with an embodiment of the present disclosure and FIG. 3 is an exemplary flow diagram illustrating a method for benchmark based cross platform service demand prediction of an application under test 10 in accordance with an embodiment of the present disclosure.

In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented on a server or in a variety of computing systems, such as a laptop computer, a desktop computer, a notebook, a workstation, a mainframe computer, a server, a network server, cloud, hand-held device and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules 102A through 102D of the system 100 can be stored in the memory 102 and are implemented by the one or more processors 104.

Figure 4A:
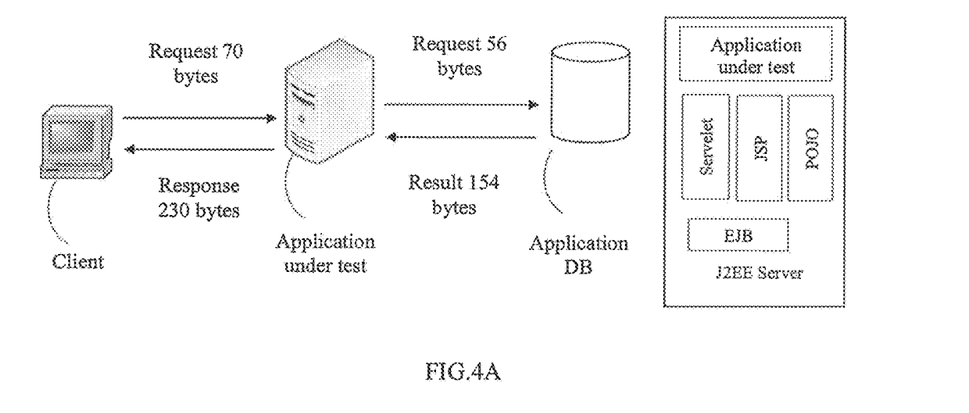
FIG. 4A and FIG. 4B illustrate a schematic representation of a performance mimicking benchmark in accordance with an embodiment of the present disclosure.
Figure 4B:
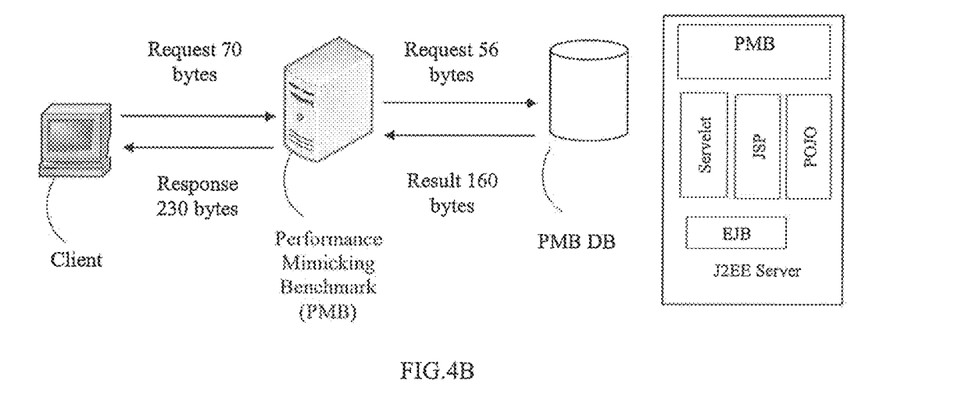

The methodology for deriving a performance mimicking benchmark (PMB) for a real-world enterprise application is described hereinafter. The aim of the PMB is to emulate an application under test in terms of resource utilization at the application server. Since it is difficult to mimic application functionality without access to the source code, lower level method calls at the technology layers (like application container or databases system) and to the operating system are mimicked as illustrated in FIGS. 4A and 4B wherein a schematic representation of a performance mimicking benchmark in accordance with an embodiment of the present disclosure is illustrated. The PMB is implemented as a web application and deployed using the same container as the actual application. Further, PMB uses the same software stack of the application server and the database server (e.g., JBoss and Postgres). These Performance Mimicking Benchmarks (PMBs) make similar lower level method calls corresponding to different layers in the technology stack. While profiling a number of mult-tier applications, it is observed that interactions among the tiers and calls to various layers contribute to a major portion of the application server CPU resource demand as compared to method calls doing the actual business processing. Hence, PMBs of the present disclosure are designed to capture lower level method calls made across different tiers. As a result, it can be presumed that ratio of service demands of PMB and that of the application under test remain almost unchanged on the source as well as target platform. Thus, PMB helps in estimating the resource service demand of the application under test on the target platform.

If the resource service demands of the application under test and PMB are referred as APPsource and PMBsource on the source platform, then by obtaining resource service demand of PMB on the target platform as PMBtarget, in accordance with the present disclosure, the resource demand of the application can be estimated by Equation 1 as follows:

$$APPtarget = \frac{APPsource \times PMBtarget}{PMBsource}$$

The steps of the method of the present disclosure as illustrated in FIG. 3 will now be explained with reference to the components of the system 100 as depicted in FIG. 2. At step 202, an application under test 10 is profiled by an application profiler 12 to obtain pre-defined method calls made by the application under test 10. In accordance with the present disclosure, the pre-defined method calls are lower level method calls that correspond to a technology stack used by the application under test 10. Further, the PMB uses similar higher level components as the application under test 10 and deployed in the same container as the application under test 10. For instance, if the application under test is a J2EE application and its components are Enterprise JavaBeans (EJB), Plain Old Java Objects (POJO) and web components (i.e., Servlets, JavaServerPages (JSP), then PMBs are written using similar components as illustrated in FIG. 4A and FIG. 4B. In an embodiment, the pre-defined method calls are based on invocation count and own execution time. The total CPU demand of a method is $v_i \times s_i$, wherein $v_i$ represents average number of visits a request makes to queue i and $s_i$ represents average service time at queue i for a request. Assuming that at the application server the methods are mostly CPU intensive, the total CPU demand is proportional to the sum of demands for all such methods. Based on this observation, the present disclosure provides service demand of the PMB on the source platform as Equation 2 herein below—

$$PMBsource = \sum_i v_i \times s_i$$

For an OLTP application, three tiers are identified as: client tier, application/web tier and database tier. At step 204, the application profiler 12 captures data flow sequences between the client tier, the application/web tier and the database tier of the application under test 10. This aspect of PMB helps in mimicking the behavior of individual transactions of the application under test 10. For every transaction, the information on how the request and response data are flowing through different tiers are captured. The requests from client passes through these tiers in a certain sequence before the response is received by the client. Even though a simple flow could be web tier followed by database tier and database tier to web tier and back to client tier, in some requests database tier may not be used (e.g., forwarding requests from one jsp page to another) or in some requests, it may pass through web tier and database tier a number of times before the actual response is sent back to the client (e.g. first retrieving a state list followed by branch list within a state). Hence, two such sample data flows are (1) client to web server, web server to database, database to web server and web server to client and (2) client to web server, web server to database, database to web server, web server to database, database to web server, then web server to client.

At step 206, a network packet analyzer 14 analyzes one or more transactions of the application under test 10. In an embodiment, analyzing the one or more transactions comprises characterizing send and receive network calls between the application under test 10 and one or more external services including a database for retrieving and storing relevant information and a client accessing the application under test 10 to estimate impact on CPU utilization. PMB of the present disclosure attempts to mimic all network calls made by the application under test 10. The PMB sends and receives the same number of bytes to and from web clients as illustrated in FIG. 4A and FIG. 4B. The size of requests and replies is determined during application profiling using the network packet analyzer 14 that runs on the same server where application server is running. This information is gathered by accessing different transactions of the application under test 10 through a web client and by tracking all the packets between the application server and the web client. Thereafter, the PMB mimics send and receive calls between the application under test 10 and its database server. The database response time and result set size varies with the type of query. The application is profiled with various combinations of parameters and an average result set size is gathered. The PMB of the present disclosure is based on a query request that receives the average result set size. To avoid access to application database, a dummy database is created on the same machine as the database server of the application under test 10 in the source platform. The PMB makes requests to and receives responses from this dummy database server. The dummy DB consists of a number of tables with multiple fields of different sizes. In an embodiment, based on the size of records retrieved in the application under test 10, PMB makes SQL queries dealing with that many fields as to match the actual record size.

At step 208, an input file creator 102A is configured to generate an input file for each of the one or more transactions based on output from the application profiler 12 and the network packet analyzer 14. An exemplary input file is as represented herein below— name_of_transactions=view catalog;
no_of_requests=1;
desc_of_dataflow=cl_web_db_web_cl;
no_of_bytes_cl_web=70;
no_of_bytes_web_db=56;
no_of_bytes_db_web=154;
no_of_bytes_web_cl=230;
type_of_sqls=Select;
com.ibatis.dao.impl.invoke 1
com.ibatis.ResultMap.getResults 2
org.mysql.jdbc.InputStream.read 8
org.apache.jsp.catalog_jsp 1
org.apache.struts.doStartTag 2
org.apache.struts.WriteTag 2

The first part of the input file specifies the transaction name and the number of http web requests the transaction makes. The next part specifies the data flow within the transaction and for each pair of tiers such as between the client and web tier the amount of bytes transferred. The next statement indicates the type of SQL statement whether it is insert, delete, update or select query. The last section provides a detailed method list and their invocations. PMB incorporates equivalent method calls corresponding to the observed method calls. Thus PMBs of the present disclosure ensure that during execution on the target platform, CPU performs a mix of important operations that is similar to that performed by the application under test 10 deployed and executed on a source platform.

At step 210, a Performance Mimicking Benchmark (PMB) generator 102C is configured to select, from a skeletal performance mimicking benchmark (PMB) Repository 102B, a skeletal benchmark corresponding to the technology stack used by the application under test 10. At step 212, the Performance Mimicking Benchmark (PMB) generator 102C is further configured to generate a performance mimicking benchmark (PMB) corresponding to the application under test 10 based on the selected skeletal benchmark and the generated input file. In an exemplary experiment, in order to generate PMB, a sample application was first profiled through a standard profiler (e.g., YourKit, JVisualVM etc.) to obtain the lower level method calls made by the application. Further, individual transactions of the application were analyzed through a packet analyzer. The information gathered using the application profiler as well as the network packet analyzer was incorporated in an input file and PMBs were generated using the input file. Based on the technology stack being used by the application, the types of lower level method calls are different and hence the CPU consumption due to method invocations can be different. As a preliminary step in the process of automatically building PMB, the present disclosure provides for generating a repository of skeletal benchmarks corresponding to one or more technology stacks usable by one more applications including the application under test. For example, under Java frameworks, there can be PMB skeletons for Spring MVC, Apache Axis, Hibernate and Struts etc. Based on the application profiler information, an application mapper module (not shown) is used by the PMB generator 102C to select an appropriate skeletal benchmark. Thus, different PMBs are required to be built for different technology stacks. Using the selected PMB skeleton and application specific information incorporated in the input file, the actual PMB for the application is built by the PMB generator 102C.

In an embodiment, the step 212 wherein a PMB is generated, is followed by estimating service demand of the application under test 10 on a target platform for a range of concurrencies based on service demand of the application under test and service demand of the performance mimicking benchmark on a source platform for the range of concurrencies and service demand of the performance mimicking benchmark on the target platform for the range of concurrencies. Accordingly, in an embodiment, the step 212 can be followed by deploying and executing the performance mimicking benchmark on a source platform 214, deploying and executing the application under test on the source platform 216 and deploying and executing the performance mimicking benchmark on a target platform 218. Step 220 involves computing service demand of the application under test and service demand of the performance mimicking benchmark on the source platform for a range of concurrencies and step 222 involves computing service demand of the performance mimicking benchmark on the target platform for the range of concurrencies. In an embodiment, estimated service demand of the application under test on a target platform for the range of concurrencies is a ratio of (i) product of service demand of the application under test on the source platform and service demand of the performance mimicking benchmark on the target platform for the range of concurrencies and (ii) service demand of the performance mimicking benchmark on the source platform for the range of concurrencies as represented by Equation 1 herein above.

EXPERIMENTAL RESULTS

The effectiveness of performance mimicking benchmarks (PMBs) in predicting service demands for different target platforms were evaluated on three different server configurations given below in Table 1—

TABLE 1

Server categories for experimental setup

| Server Type | Features |
|---|---|
| Intel | 8 Core CPU 2.48 GHz Xeon with 1 MB L2 cache. 8 GB Physical RAM |
| AMD | Quad Core AMD Opteron CPU 2.19 GHz with 2 MB L2 cache, 4 GB RAM |
| Solaris | 4 Core UltraSparc CPU 1.5 GHz with 32 MB cache, 16 GB RAM |

The evaluation was performed on web applications written in Java such as JPet™, an online Petstore which is a standard J2EE benchmark; NGCel, a proprietary reporting application on next-generation cellular phone usage; and SPECjEnterprise2010™, an industry standard SPEC® benchmark. These applications allow PMB to be tested for different scenarios such as rendering display with or without jsp pages, using strut framework, using J2EE container etc. In the experimental setup, the technology stack of the PMBs consisted of Apache Tomcat container or glassfish J2EE application server with MySQL as the database server. The following discussion on the experiment performed pertains to CPU resource demand of the application tier on the three different server configurations as given in the table herein above.

NGCel Application: Service demands vary with concurrency in all applications. Hence, NGCel transactions were run with different number of users and CPU utilization and throughput values were obtained. Using utilization law, service demands at various concurrencies were estimated. For NGCel application, the source platform was taken as Intel server and target platforms were AMD and Solaris. Based on the ratio of service demands of NGCel to PMB on the source platform and service demand of PMB on the target platforms, service demand of NGCel was predicted on the target platforms. Error % was then computed for three different transactions of NGCel as shown below in Table 2.

TABLE 2

Computed and predicted values of service demands (in ms) and error % in prediction for various transactions of NGCel at different concurrencies (shown in bracket) with Intel server as source platform and AMD and Solaris as target platforms.

| NGCel Transaction | APP Intel | PMB Intel | PMB AMD | PMB Solaris | APP AMD | Predicted AMD | Error % AMD | APP Solaris | Predicted Solaris | Error % Solaris |
|---|---|---|---|---|---|---|---|---|---|---|
| Most used (400) | 1.98 | 1.89 | 3.14 | 4.29 | 3.6 | 3.3 | 8.5 | 4.92 | 4.51 | 9.54 |
| Most used (500) | 2.00 | 1.83 | 3.23 | 4.44 | 3.68 | 3.52 | 4.4 | 5.02 | 4.85 | 3.78 |
| Best Month (400) | 1.39 | 1.18 | 1.91 | 2.01 | 2.2 | 2.25 | 2.26 | 2.17 | 2.37 | 9.19 |
| Best Month (500) | 1.44 | 1.23 | 2.03 | 2.05 | 2.3 | 2.39 | 4.2 | 2.26 | 2.42 | 7.03 |
| Home Page (400) | 1.81 | 1.58 | 2.25 | 3.76 | 2.55 | 2.58 | 1.15 | 4.41 | 4.31 | 2.13 |
| Home Page (500) | 1.78 | 1.56 | 2.26 | 4.1 | 2.6 | 2.58 | 0.72 | 4.91 | 4.68 | 4.7 |

It was observed that error percentage was less than 10% in all situations. In an exemplary embodiment, the error computation using service demand of Best Month transaction in Table 2 is illustrated herein below.

The ratio of service demands of NGCel and its PMB on Intel server for 400 users is obtained as =1.39/1.18=1.177. This is used to predict demand on AMD server as =1.17×demand of PMB=1.17×1.91=2.25 ms. But the actual service demand on AMD server is 2.2 ms. Hence, $$\text{Error \%} = \frac{(|2.2 - 2.25|) \times 100}{2.2} = 2.26$$

Figure 5A:
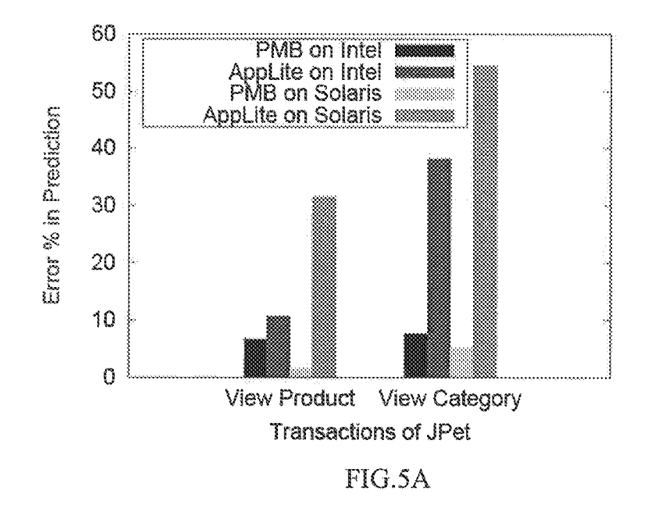
FIGS. 5A and 5B illustrate experimental trends observed with error percentage prediction of service demands for PMB and AppLite benchmark application compared for JPetStore™ application and NGCel applications respectively.
Figure 5B:
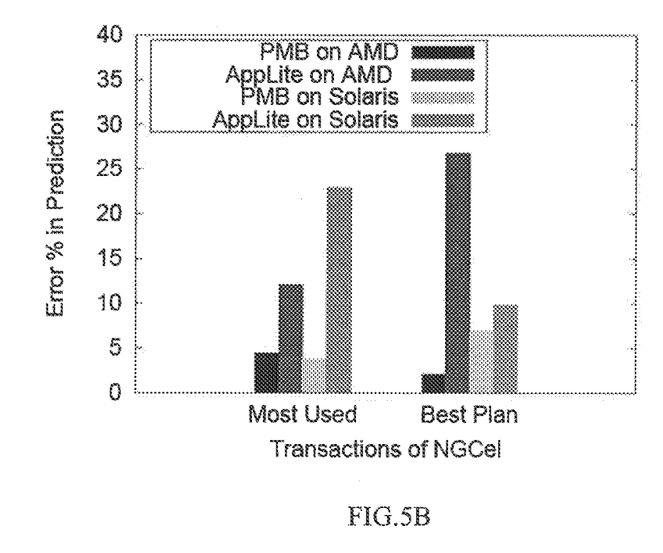

Comparison with AppLite Benchmark: An experiment was performed to compare the accuracy of service demand prediction by PMB of the present disclosure with that of an equivalent technique known in the art. An AppLite benchmark was developed using a technique known in the art to mimic send and receive network calls of an application under test by sending to and receiving same amount of bytes from a simple socket server. Further CPU utilization of the application under test was matched by AppLite by executing integer arithmetic operations. Parameters of arithmetic operations were adjusted according to transactions being profiled. The comparison of service demands was done on Intel as a Source platform and AMD and Solaris as target platforms. FIGS. 5A and 5B illustrate experimental trends observed with error percentage prediction of service demands for PMB and AppLite benchmark application compared for JPet application and NGCel applications respectively. FIG. 5A compares error % for PMB and AppLite in case of JPet™ application for 400 users on Solaris platform. The average error % of AppLite is 40% while with PMB it is around 5%. The PMB is found to be more accurate because it is designed to capture important method calls that result in significant CPU consumption. Further, it attempts to mimic the network calls made by the application. It is also seen that AppLite performs poorly for transactions where network I/O has a large contribution to CPU consumption. The reason behind this is that the ratio of service demands of AppLite between two platforms increases with the higher network load. FIG. 5B compares error % in prediction of service demands for PMB and AppLite for NGCel application with 500 users. Though in this case the maximum error in prediction is around 27% for AppLite, PMB has the highest error of 7% thereby validating the better accuracy in service demand prediction by PMBs of the present disclosure.

Figure 6:
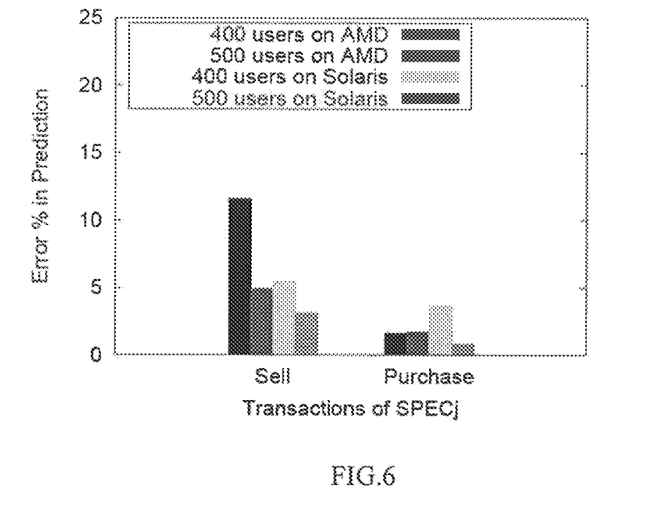
FIG. 6 illustrates experimental trends observed with error percentage prediction of service demands of SPECjEnterprise® using PMB on AMD and Solaris target platforms.

FIG. 6 illustrates experimental trends observed with error percentage prediction of service demands of SPECjEnterpnse® using PMB on AMD and Solaris target platforms. Intel platform was used as the source platform. SPECjEnterprise2010™ is an industry standard application that provides a business scenario for an automobile manufacturer. Though the SPECjEnterprise2010™ application supports supplier domain for supply chain management (SCM), the manufacturing domain and the orders domain for the customer relationship management (CRM), the PMB was built only for the orders domain since this is the only domain that is accessible through web interface. The PMB was run on a glassfish application server with MySQL as database server and was designed to support sell and purchase transactions. In FIG. 6, it is seen that independent of concurrency, the error % is less than 12% on AMD platform and less than 5% on Solaris platform. The prediction error percentage variation across AMD and Solaris platforms may be due to difference in architecture and varying system parameters.

Figure 7A:
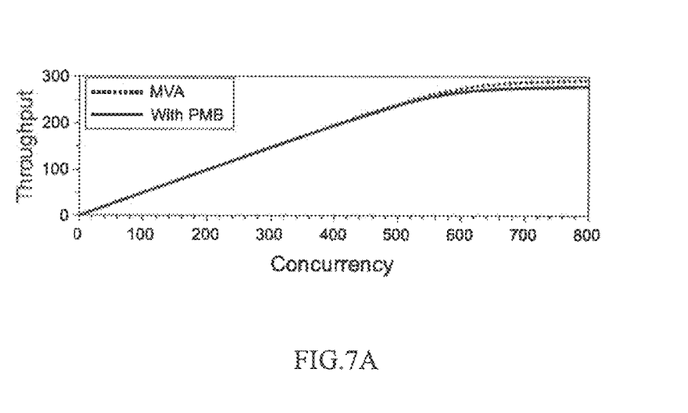
FIGS. 7A through 7C illustrate experimental trends observed for throughput, response time (in secs) and CPU utilization at the application server as computed (MVA) and predicted for SPECjEnterprise® application by a modified MVA algorithm using service demands predicted by systems and methods in accordance with an embodiment of the present disclosure.
Figure 7B:
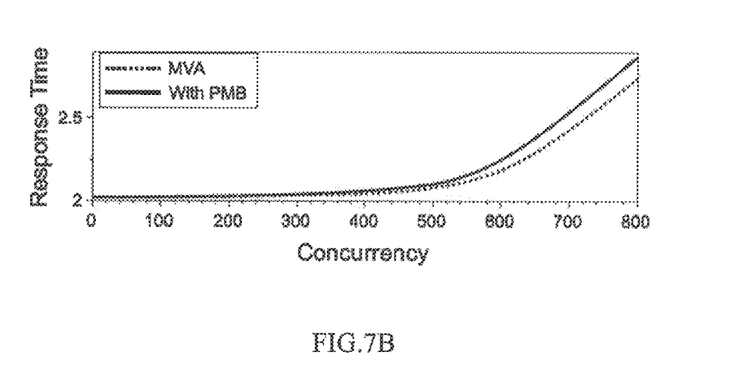
Figure 7C:
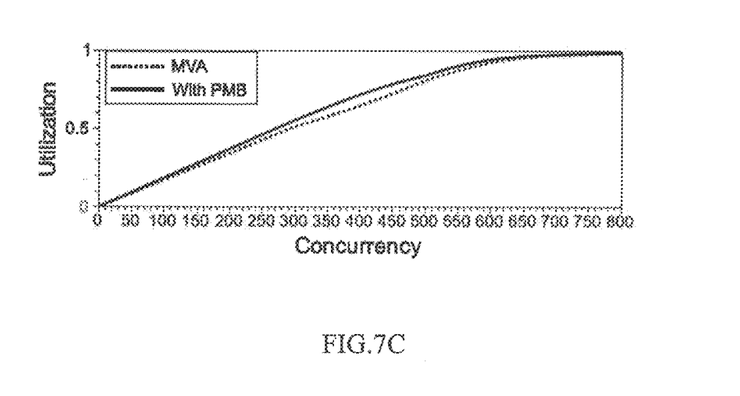

FIG. 7A through 7C illustrate experimental trends observed for throughput, response time (in secs) and CPU utilization at the application server as computed (MVA) and predicted for SPECjEnterprise® application by a modified MVA algorithm using service demands predicted by systems and methods in accordance with an embodiment of the present disclosure. The predicted service demands can be utilized as input to a modeling technique to finally predict performance metrics such as throughput, response time and CPU utilization. Since PMBs are used to predict service demands for discrete user levels, a modified version of mean value algorithm (MVA) that uses exact MVA but allows load dependent service demands was utilized. The modified MVA algorithm accepts an array of service demands at distinct load values. For this experiment, the SPECjEnterprise2010™ benchmark was executed on AMD target platform for 300, 400 and 500 users. It was observed that for all user levels upto 700 users, the average error in throughput and response time was found to be less than 5%. It was verified that PMB of the present disclosure is able to provide same level of accuracy in actual performance prediction as the original application, SPECjEnterprise2010™ in the instant experiment.

Thus in accordance with the present disclosure, the performance mimicking benchmark (PMB) aims to attain a representative estimate of service demand of the application under test rather than an accurate service demand of the application. Since exact similarity is not required for the method of the present disclosure, the PMBs can be reused to represent multiple applications. The PMBs can also help in reducing the time to market by providing a baseline performance estimate of the application on a given target platform. We methods of the present disclosure enable creating benchmarks that require only application level profiling rather than kernel-level tracing or execution environment instrumentation. The benchmarks are designed to provide a representative value of service demand of the application on a production platform and can help in obtaining early performance estimate in the software life-cycle.

The written description describes the subject matter herein to enable any person skilled in the art to make and use the embodiments of the disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A method comprising:
    profiling an application under test, by an application profiler, to obtain pre-defined method calls made by the application under test, wherein the pre-defined method calls are lower level method calls corresponding to a technology stack used by the application under test and wherein the pre-defined method calls are selected based on a number of times a method is invoked during the execution of the application and an amount of time a method takes excluding sub-calls made by the method;
    capturing, by the application profiler, data flow sequences between client tier, application tier and database tier of the application under test;
    analyzing, by a network packet analyzer, one or more transactions of the application under test, wherein analyzing the one or more transactions comprises characterizing send and receive network calls between the application under test and one or more external services including a database and a client accessing the application under test to identify operations impacting central processing unit (CPU) utilization;
    generating, by an input file creator, an input file for each of the one or more transactions based on output from the application profiler and the network packet analyzer, wherein the input file includes a transaction name, a number of web requests made by the transaction, data flow within the transaction and an amount of bytes transferred between each pair of the tiers, a type of SQL statement, the method calls and corresponding invocations;
    selecting, from a skeletal performance mimicking benchmark (PMB) Repository, a skeletal benchmark corresponding to the technology stack used by the application under test; and
    generating, by a Performance Mimicking Benchmark (PMB) generator, a performance mimicking benchmark (PMB) corresponding to the application under test based on the skeletal benchmark and the input file.

2. The method of claim 1, wherein selecting a skeletal benchmark is preceded by generating a repository of skeletal benchmarks corresponding to one or more technology stacks usable by one more applications including the application under test.

3. The method of claim 1 further comprising estimating service demand of the application under test on a target platform for a range of concurrencies based on service demand of the application under test and service demand of the performance mimicking benchmark on a source platform for the range of concurrencies and service demand of the performance mimicking benchmark on the target platform for the range of concurrencies.

4. The method of claim 3, wherein estimated service demand of the application under test on a target platform for the range of concurrencies is a product of (i) ratio of service demand of the application under test on the source platform and service demand of the performance mimicking benchmark on the source platform for the range of concurrencies and (ii) service demand of the performance mimicking benchmark on the target platform for the range of concurrencies.

5. The method of claim 1, wherein the number of times the method is invoked during the execution of the application indicates a number of visits the method makes to a queue during the execution of the application and wherein the amount of time the method takes excluding the sub-calls made by the method indicates an average service time for the method at the queue.

6. A system comprising:
    one or more processors; and
    one or more internal data storage devices operatively coupled to the one or more processors for storing:
        an input file creator configured to:
            receive, from an application profiler, pre-defined method calls made by an application under test, wherein the pre-defined method calls are lower level method calls corresponding to a technology stack used by the application under test and wherein the pre-defined method calls are selected based on a number of times a method is invoked during the execution of the application and an amount of time a method takes excluding sub-calls made by the method;
            receive, from the application profiler, data flow sequences between client tier, application tier and database tier of the application under test;

analyze one or more transactions of the application under test, received from a network packet analyzer, wherein analyzing the one or more transactions comprises characterizing send and receive network calls between the application under test and one or more external services including a database and a client accessing the application under test to identify operations impacting central processing unit (CPU) utilization; and generate an input file for each of the one or more transactions based on output from the application profiler and the network packet analyzer, wherein the input file includes a transaction name, a number of web requests made by the transaction, data flow within the transaction and an amount of bytes transferred between each pair of the tiers, a type of SQL statement, the method calls and corresponding invocations;

a skeletal performance mimicking benchmark (PMB) Repository comprising skeletal benchmarks corresponding to one or more technology stacks usable by one more applications including the application under test; and a Performance Mimicking Benchmark (PMB) generator configured to:

select, from the skeletal performance mimicking benchmark (PMB) Repository, a skeletal benchmark corresponding to the technology stack used by the application under test; and generate a performance mimicking benchmark (PMB) corresponding to the application under test based on the skeletal benchmark and the input file.

7. The system of claim 6, further comprising a service demand estimator configured to estimate service demand of the application under test on a target platform for a range of concurrencies based on service demand of the application under test and service demand of the performance mimicking benchmark on a source platform for the range of concurrencies and service demand of the performance mimicking benchmark on the target platform for the range of concurrencies.

8. A computer program product comprising a non-transitory computer readable medium having program instructions embodied therein for:

profiling an application under test, by an application profiler, to obtain pre-defined method calls made by the application under test, wherein the pre-defined method calls are lower level method calls corresponding to a technology stack used by the application under test and wherein the pre-defined method calls are selected based on a number of times a method is invoked during the execution of the application and an amount of time a method takes excluding sub-calls made by the method;

capturing, by the application profiler, data flow sequences between client tier, application tier and database tier of the application under test;

analyzing, by a network packet analyzer, one or more transactions of the application under test, wherein analyzing the one or more transactions comprises characterizing send and receive network calls between the application under test and one or more external services including a database and a client accessing the application under test to identify operations impacting central processing unit (CPU) utilization;

generating, by an input file creator, an input file for each of the one or more transactions based on output from the application profiler and the network packet analyzer, wherein the input file includes a transaction name, a number of web requests made by the transaction, data flow within the transaction and an amount of bytes transferred between each pair of the tiers, a type of SQL statement, the method calls and corresponding invocations;

selecting, from a skeletal performance mimicking benchmark (PMB) Repository, a skeletal benchmark corresponding to the technology stack used by the application under test; and generating, by a Performance Mimicking Benchmark (PMB) generator, a performance mimicking benchmark (PMB) corresponding to the application under test based on the skeletal benchmark and the input file.

* * * * *